Jan. 3, 1961

F. H. NICOLL 2,967,248

ELECTROLUMINESCENT DEVICE

Filed Sept. 6, 1956

3 Sheets-Sheet 1

INVENTOR.
Frederick H. Nicoll
BY
William A. Zalesak
ATTORNEY

INVENTOR.
Frederick H. Nicoll
BY
William A. Zalesak
ATTORNEY

Jan. 3, 1961 F. H. NICOLL 2,967,248

ELECTROLUMINESCENT DEVICE

Filed Sept. 6, 1956 3 Sheets-Sheet 3

INVENTOR.
Frederick N. Nicoll
BY
William A. Zalesak
ATTORNEY

United States Patent Office 2,967,248

Patented Jan. 3, 1961

2,967,248

ELECTROLUMINESCENT DEVICE

Frederick H. Nicoll, Princeton, N.J., assignor to Radio Corporation of America, a corporation of Delaware Filed Sept. 6, 1956, Ser. No. 608,353

14 Claims. (Cl. 250—213)

This invention relates to electroluminescent devices for reproducing light images, and particularly to novel means for producing electroluminescent, amplified images, and/or producing enlargement of images by means not requiring an optical lens system.

Various devices have been proposed for amplifying a light image by using the combination of photoconductive and electroluminescent layers arranged in a panel. In such devices, an image is established on the photoconductive layer and is reproduced in amplified form on the electroluminescent layer. Generally, the layers are arranged close together and have the same overall area. Thus, if the image to be amplified is of small dimensions, as from a small size cathode ray tube, for example, and a magnified image is desired, then an optical lens system is placed between the cathode ray tube and the panel, and the panel is made as large as is desired. However, such a light amplifying and enlarging system requires a large amount of space, and consequently a rather bulky enclosure is needed.

In addition, present light amplifying structures of the type described are not suitable in applications where a probing type operation is involved, such as in medical examinations of internal organs, or detecting flaws in work pieces at locations which are not readily accessible.

An object of the present invention is to provide a new and improved electroluminescent, image reproducing device.

Another object of this invention is to provide a novel electroluminescent, image reproducing device which produces image magnification by means characterized by simplicity and compactness in design.

A further object is to provide a novel electroluminescent, image reproducing device capable of probing into hidden areas.

The foregoing and other objects are achieved in accordance with the invention by providing a device including a photoconductive layer and an electroluminescent layer spaced apart from each other and connected together by a multiplicity of spaced elongated conductors, there being at least one conductor for each picture element. The conductors are disposed in a laminated structure comprising a stack of thin sheets of insulating material each of which sheets bears a plurality of the conductors.

According to one feature of the invention, the edges of the insulating sheets adjacent to the electroluminescent layer are staggered, i.e. stepped, to such an extent that the ends of the conductors connected to the electroluminescent layer define an area having a dimension across the steps which is greater than the corresponding dimension adjacent to the photoconductive layer, in order to produce image magnification at least in this one dimension.

According to another feature of the invention, the conductors of each insulating sheet are divergent toward the electroluminescent layer, along at least a part of their length, and the spacing between the ends adjacent to the electroluminescent layer is greater than the spacing between the opposite ends of the conductors, i.e. the ends adjacent to the photoconductive layer. In this way, image magnification is produced in the other dimensions.

The above two features are also combined to produce image magnification in both dimensions.

According to another feature of the invention the laminated sheets are flexible so that they may be easily bent to permit the photoconductive end of the structure to serve as an easily maneuverable probe.

Figure 1:
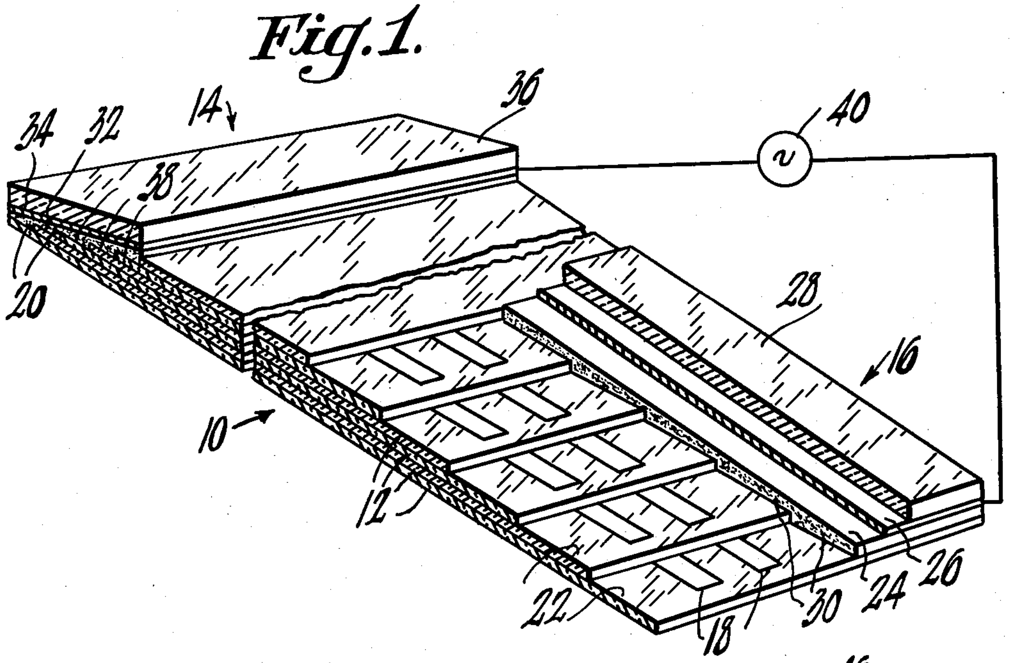
Fig. 1 is a partial perspective view partly in section of an electroluminescent device having enlargement in one dimension according to the invention.

Referring to Fig. 1 there is shown an electroluminescent device 10 comprising a stack of thin sheets or laminations 12 of insulating material. At one end of the device, the sheets 12 terminate in an image receiving area 14, and at the other end, in a light emitting or image producing area 16. The number of sheets 12 may be very large; however, for simplicity of illustration only six are shown. Each sheet 12, except the top one, has supported on the top surface thereof, as by printing, a plurality of elongated conductors 18 which are spaced from each other, and in this embodiment, are all parallel. The conductors 18 are arranged so that they extend lengthwise between the image receiving area 14 and the image producing area 16. The sheets 12 have the same width but are of different length, their length progressively increasing from the top to the bottom of the stack. The sheets 12 are staggered or stepped at both ends of the device 10, and in this embodiment, the steps 20 and 22 at both ends extend progressively outwardly of the device in going from the top sheet to the bottom of the device. However, the amount of stagger is much greater at the image producing area 16 than at the image receiving area 14 and therefore the slope is longer at the image producing area 16 than at the image receiving area 14, and the area defined by the ends of the conductors 18 is greater at the image producing area 16 than at the image receiving area 14. Hence, magnification or enlargement of the image is produced in one dimension and also in area. A sufficient amount of stagger at both ends is provided so that the end portions of the conductors 18 are exposed on the steps 20 and 22.

The image producing area 16 comprises a layered structure including, in order, a layer 24 of electroluminescent phosphor material covering the steps 22, and a layer 26 of transparent conductive material coated on a glass plate 28. The layer 24 of electroluminescent phosphor material constitutes a planar array of elongated elements 30 of generally triangular cross section, one side of the elements 30 being in contact with the ends of the conductors 18.

Similarly, the image receiving area 14 comprises a layered structure including, in order, a layer 32 of photoconductive material, a transparent conductive layer 34, and a glass plate 36 disposed on the steps, forming a planar array of elongated photoconductive elements 38. The transparent conductive layers 26 and 34 are adapted to be connected to opposite terminals of a voltage source 40. Thus, the spaced elongated conductors 18 serve to electrically connect spaced areas on one side of each photoconductive element 38 with corresponding spaced areas on one side of one of the electroluminescent elements 30.

The insulating sheets 12 may be made of thin plastic, such as a polyester film, for example, and are preferably flexible to permit bending at the middle portions of the device 10. Printed lines of silver paint, or evaporated silver or gold, may be used for the conductors 18. The transparent conductive coatings 26 and 34 may be tin oxide or evaporated metal, such as silver or gold, for examples. The photoconductive material 32 may consist of cadmium sulfide or cadmium selenide crystal powder, held together by a plastic binder. Photoconductive crystal powders are disclosed in copending application of Charles J. Busanovich and Soren M. Thomsen, Serial No. 472,354, filed December 1, 1954, now U.S. Patent 2,876,-202. The electroluminescent phosphor layer 24 may be any of the well known materials such as zinc sulfide suitably activated with copper or manganese, as examples, and may be embedded in a dielectric material, such as ethyl cellulose or an epoxy resin. The source voltage 40 may be several hundred volts alternating current, having a frequency of several hundred cycles. Direct current may be used, but in this case, the dielectric material would be omitted from the electroluminescent layer 24.

In operation, the exposed end portion of each of the conductors 18 in contact with the electroluminescent phosphor layer 24 cooperates with registered portions of a phosphor element 30 and the conductive layer 26 to make up an elemental electroluminescent cell of a given impedance. Similarly, each exposed end portion of the conductors 18 in contact with the photoconductive material 32 cooperates with registered portions of one of the photoconductive elements 38 and the conductive layer 34 to make up an elemental photoconductive cell having a given dark impedance. By proper selection of materials and layer thicknesses, the photoconductive cell is designed to have a dark impedance substantially higher than that of the corresponding electroluminescent cell. Each elongated conductor 18 thus connects a photoconductive cell in series with an electroluminescent cell and the voltage source 40. Thus a voltage divider network is produced, with the voltage from the source 40 being divided in proportion to the relative impedances of the photoconductive and electroluminescent cells.

The device 10 is designed so that each electroluminescent cell operates just below its threshold voltage in the dark condition of the photoconductive cell connected thereto. When the photoconductive cell is energized by light or other incident radiant energy, its impedance is lowered to such an extent as to produce an increased voltage across the electroluminescent cell, which thereupon emits light. The impedance of the photoconductive cell varies in accordance with the amount of light which excites it; the greater the light the lower the impedance. Accordingly, the voltage across the electroluminescent cell and the light emitted thereby is correspondingly varied. Thus, an image projected on the image receiving area 14 is reproduced element by element on the image producing area 16.

The total quanta of light emitted from the image producing area 16 is greater than the total quanta of light incident on the image receiving area 14, by virtue of the added energy derived from the voltage source 40. Inasmuch as the total area defined by the ends of the conductors 18 adjacent to the electroluminescent elements 30 is greater than the corresponding area at their opposite ends, an amount of image magnification or enlargement is produced in one dimension. Whether or not a brightness gain results depends on whether the light amplification ratio is greater than the magnification ratio.

When alternating current voltage is used for the source 40, there may be some loss in resolution due to capacitive coupling between adjacent conductors 18. To improve resolution, a source of direct current voltage may be used, in which case capacitive coupling will occur only when changes in the picture occur. When the input to the device 10 is a scanned picture, such as is produced from a cathode ray tube, it may be advantageous to use a photoconductor having a relatively slow response so as to minimize the effects of coupling.

The conductors 18 terminate just short of the end edge of the sheet 12 on which they are disposed to minimize current leakage to the conductors 18 just below. Leakage current can be further minimized by staggering the conductors 18 of one sheet with the conductors 18 of the sheet below. The latter expedient will also reduce capacitive coupling.

Figure 2:
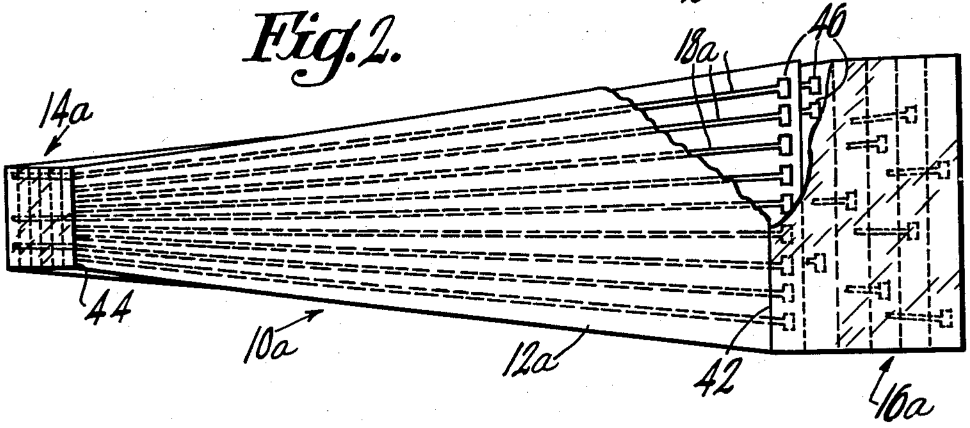
Fig. 2 is a plan view with portions removed, of an electroluminescent device having enlargement in two dimensions according to the invention.

In the device **10*a* shown in Fig. 2 image magnification is produced in two dimensions. In this device, each of the insulating sheets 12*a* has a trapezoidal shape, with the base 42 of the trapezoid lying in the image producing area 16*a*. The sheets are differentially staggered, as in Fig. 1, to produce magnification in the horizontal direction as shown in Fig. 2. In addition, by forming each of the sheets 12*a* in the shape of a trapezoid magnification is produced in a vertical direction as shown in Fig. 2. The elongated conductors 18*a* diverge in the direction from the image receiving area 14*a* to the image producing area 16*a*. Hence, the ends of the conductors 18*a* at the base 42 of each sheet 12*a* define a length which is greater than the corresponding length at the top 44 of the sheet 12*a*. The ends of the elongated conductors 18*a* may terminate in conductive elements or areas 46 which have dimensions substantially greater than the width of the conductors 18*a***. This is done to increase the size of each elemental electroluminescent area. The total light emitting area is thereby increased.

Figure 3:
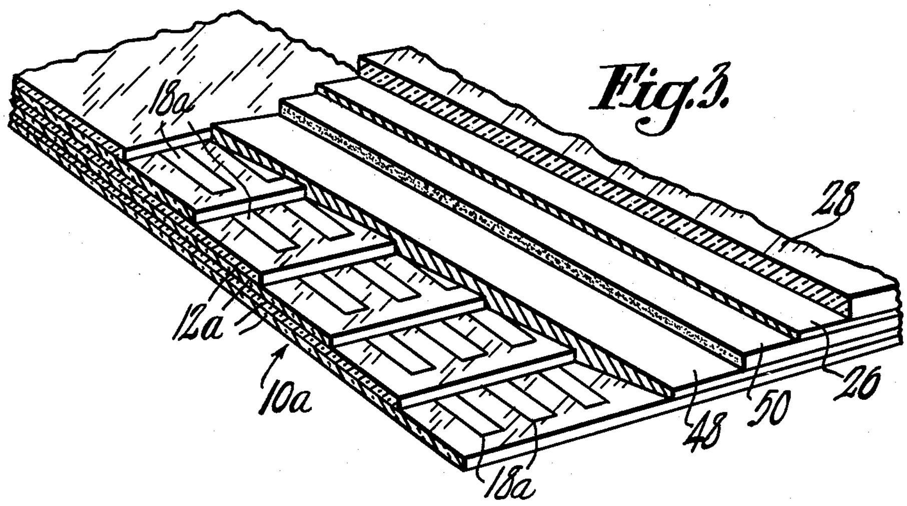
Fig. 3 is a fragmentary view partly in section of a modification of the device of Fig. 2.

The total electroluminescent light emitting area in Fig. 2 may be increased by omitting the enlargements 46 of the ends of the conductors **18*a* and disposing a current diffusing layer 48 between the conductors 18 and an electroluminescent phosphor layer 50 of uniform thickness, as shown in Fig. 3. The current diffusing layer 48 may be made of conducting cadmium sulfide powder, applied as a dry powder or mixed with a plastic binding material. It serves to spread the currents flowing between the conductors 18*a* and the transparent conductive layer 26** so as to produce a greater area of light emission from each elemental electroluminescent cell. The boundaries of the diffused currents will be better defined if the current diffusing material is one having a non-linear impedance characteristic, that is, one whose impedance is proportional to the applied electric field raised to a power greater than unity. The properties of such a current diffusing layer are discussed in copending application of Benjamin Kazan, filed December 30, 1954, Serial No. 478,707, now U.S. Patent No. 2,949,537.

Figure 4:
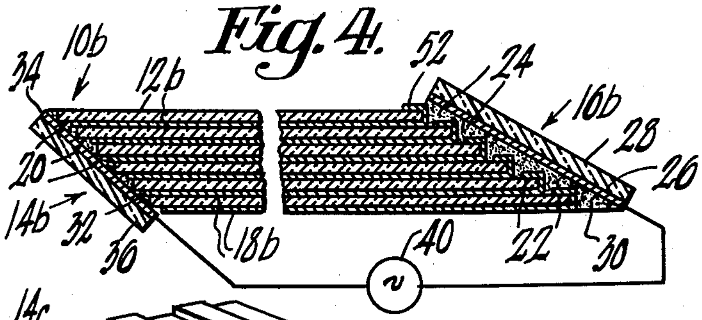
Fig. 4 is a sectional view showing a further modification of the invention.
Figure 5:
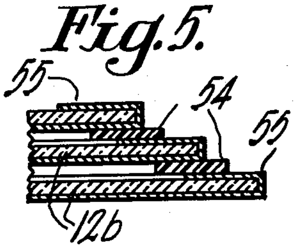
Fig. 5 is a fragmentary sectional view of an alternative form of the device of Fig. 4.

In the device **10*b* of Fig. 4, sheets 12*b* are arranged to produce steps 22 extending outwardly in descending order from the top to the bottom of the device at the image producing end 16*b* as in the devices previously described. However, at the image receiving end 14*b*, the steps 20 extend outwardly from the bottom to the top of the device. In this case, at one end of each sheet, say the image producing end 16*b*, for example, the conductors 18*b* lap over the edge of the sheet 12*b*** and terminate on the opposite side a short distance from the edge of the sheet 12*b* to form an overlap 52. This is done in order to provide contact with the electroluminescent layer 24. The overlaps 52 of the conductors 18*b* are spaced from the next adjacent conductors 18*b* by sufficient distance to prevent current leakage. Alternatively, as shown in Fig. 5, an additional insulating sheet 54 is provided between the conductors 18*b* to space them apart, and hence, provide a long leakage path, so that the overlaps 55 can be extended a greater amount.

In the devices thus far described, 500 line resolution in both a vertical and horizontal direction may be achieved by using 500 insulating sheets in a stacked array, each sheet bearing 500 elongated conductors. By making the sheets very thin, that is, of the order of 1 to 5 mils, the stack will have a thickness of only ½ to 2½ inches. In addition, the ends of the sheets at the image producing area may be staggered a sufficient amount to produce a picture having a horizontal dimension of 10 to 20 inches, for example. Also, by providing suitable divergence of the conductors the picture may have a comparable vertical height.

Figure 6:
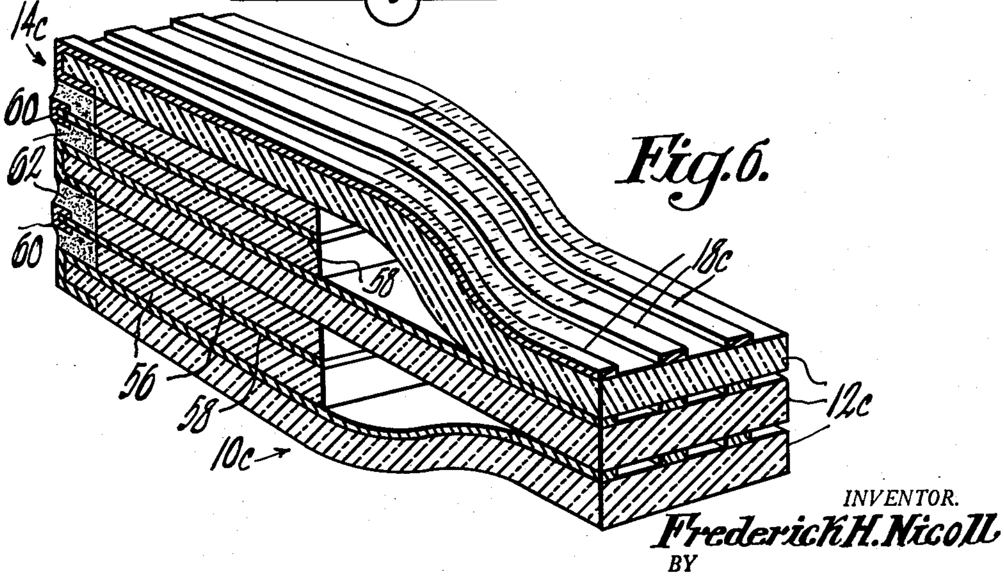
Fig. 6 is a partial perspective view partly in section of a still further modification of the invention.

In the devices thus far described, the photoconductive process occurs such that the photocurrents flow through the thickness of the photoconductive layer. Generally, in such devices, the photoconductive layer must be made rather thick in order to provide a sufficient impedance to drive the elemental electroluminescent cells. The result is that such thick layers are relatively opaque to incident light, and thus their photosensitivity is impaired. Better efficiency may be achieved by providing photoconductive elements at the image receiving area which operate with lateral flow of photocurrents. Fig. 6 shows a device 10*c* designed in this manner. At the image receiving area 14*c* of this device, a plurality of insulating sheets 12*c* bearing elongated conductors 18*c* are spaced apart one from the next by a layered construction comprising two comparatively thick insulating spacers 56 and an intermediate thin insulating spacer 58. The top of each thick spacer 56 is located at a distance below the top of each thin spacer 58, as shown in the drawing. The end or top of each thin spacer 58 is coated with a conductive material to form a bus bar 60. The insulating sheets 12*c* and the elongated conductors 18*c* are assembled similarly as in Fig. 4, except that the sheets 12*c* do not have staggered ends at the image receiving area 14*c*. At the image receiving area 14*c*, the elongated conductors 18*c* lap over the edges of the insulating sheets 12*c* and terminate on the opposite side of the sheet 12*c*. The elongated voids between the insulating sheets 12*c* and the thin spacers 58 are filled with photoconductive material to form an array of elongated photoconductive elements 62. The bus bars 60 may be connected together and to one side of the supply voltage. The other side of the supply voltage may be connected to the transparent conductive coating at the image producing end.

Each elemental light receiving area consists of the two photoconductive elements 62 on opposite sides of the insulating sheets 12*c*. When this area is excited by incident light, the photocurrents flow in each photoconductive element 62 laterally across the photoconductive material between the bus bars 60 and the adjacent elongated conductors 18*c* and, assuming the proper polarity of the voltage source, converge at the conductors 18*c*. The converging photocurrents are transmitted along each elongated conductor 18*c* to excite the corresponding electroluminescent element at the image producing end.

As examples of constructional details for Fig. 6, the insulating sheets 12*c* may be 1 to 5 mils thick, as in the previous devices. The thick insulating spacers 56 may be 10 mils thick and of any convenient width, such as ½ inch. The depth of the photoconductive elements 62 may be about 20 mils. The thickness of the thin insulating spacers 58 may be 1 to 5 mils. The elongated conductors 18*c* in each sheet 12*c* may be spaced apart by 10 mils at the image receiving end 14*c*.

Figure 7:
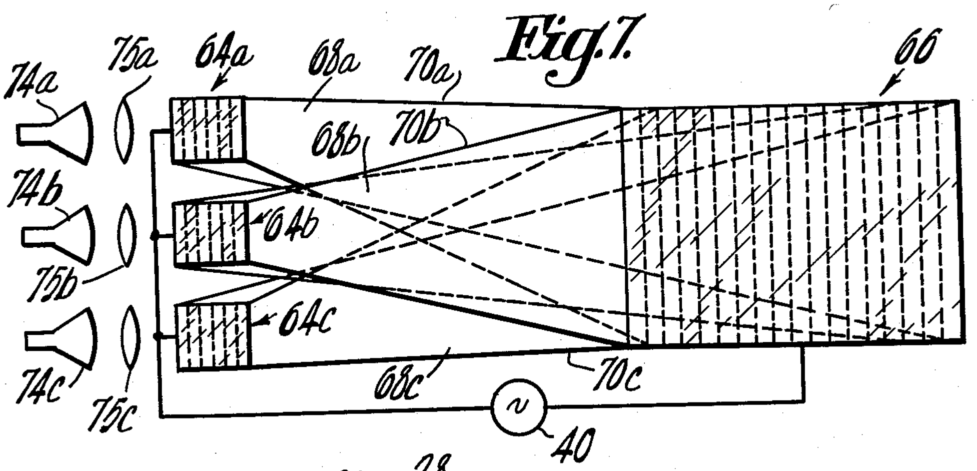
Fig. 7 is a diagrammatic view of a system, for reproducing images in color and including a device embodying the invention.
Figure 8:
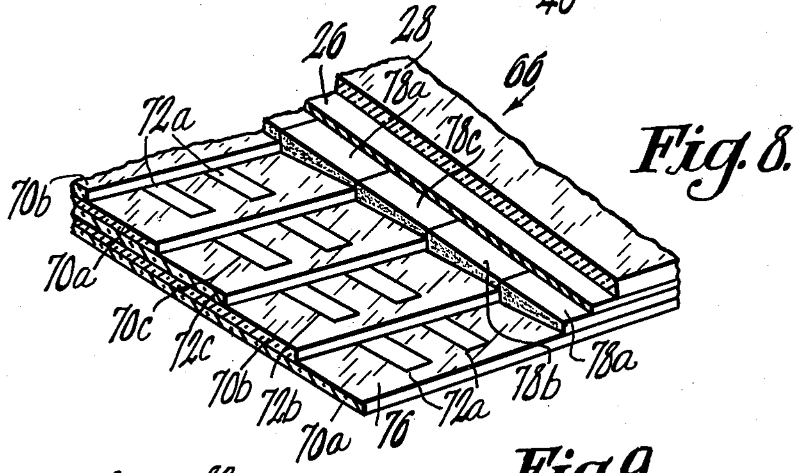
Fig. 8 is a fragmentary view partly in section of the device of Fig. 7.

Figs. 7 and 8 show a system designed for reproducing color images in magnified form. The system comprises a structure having three separate image receiving sections 64*a*, 64*b*, 64*c*, electrically connected to a single image reproducing section 66. This structure is formed by interleaving three separate sets or stacks 68*a*, 68*b*, 68*c* of insulating sheets 70*a*, 70*b*, 70*c* bearing elongated conductors 72*a*, 72*b*, 72*c*. Each image receiving section 64*a*, 64*b*, 64*c* receives light signals from a separate one of three cathode ray or light signal tubes 74*a*, 74*b*, 74*c*, the light signals being projected by means of lenses 75*a*, 75*b*, 75*c*, as shown schematically in Fig. 7. Each signal tube 74*a*, 74*b*, 74*c* emits light signals corresponding to one of the three components of color video signals to be reproduced, such as, for example, red, blue, and green. The color of the light emitted by the signal tubes 74*a*, 74*b*, 74*c* may be the same but each tube is modulated with its own video signal. Likewise, the photoconductors for the separate light receiving sections 64*a*, 64*b*, 64*c* may have the same color response and be matched to the color of the light emitted by the signal tubes 74*a*, 74*b*, 74*c*. Any of the structures that are previously described, may be used at the image receiving sections 64*a*, 64*b*, 64*c*. The image producing section 66 comprises the interleaved ends of the sheets 70*a*, 70*b*, 70*c*, staggered to form steps 76. The steps 76 are coated with three different color emitting electroluminescent phosphors in such a way to produce a line pattern of groups of three different color emitting areas 78*a*, 78*b*, 78*c*, for example, red, blue, green, red, blue, green, and so forth, repeating in that order. All the red emitting areas 78*a* are energized by the red signal tube 74*a*, the blue emitting areas 78*b* by the blue signal tube 74*b*, and the green emitting areas 78*c* by the green signal tube 74*c*. In this way a composite picture is reproduced in color and in magnified form.

Figures 9, 10:
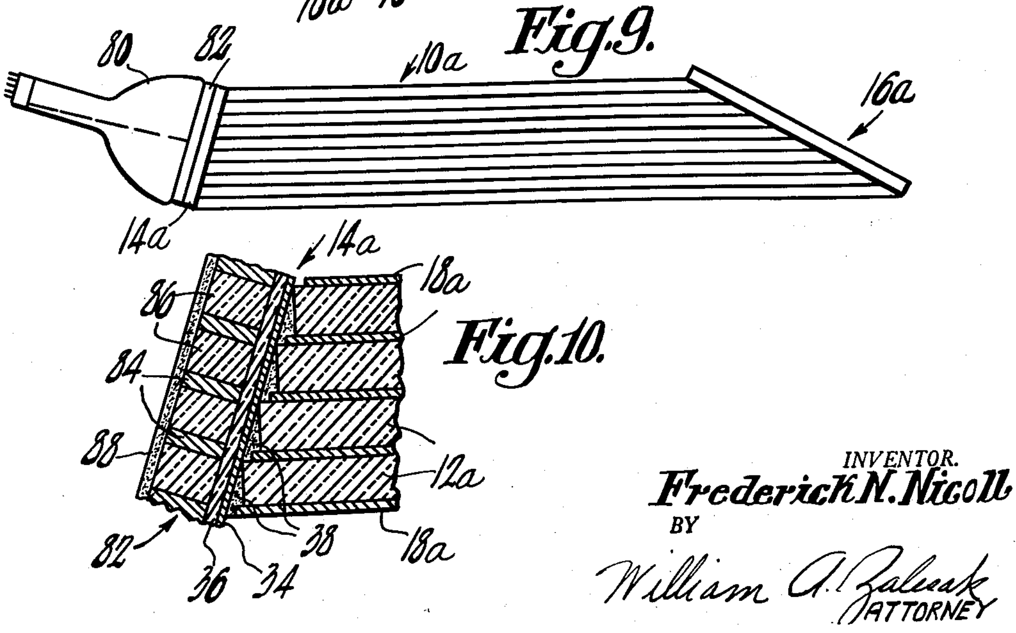
Fig. 9 is a diagrammatic view showing means for magnifying the image from a cathode ray tube and including the device of Fig. 2.
Fig. 10 is a fragmentary sectional view of the combination of Fig. 9.

Figs. 9 and 10 show means for magnifying an image from a cathode ray tube 80 without the use of an intermediate optical lens. In this embodiment, the cathode ray tube 80 is shown supported in contact with or closely adjacent to the image receiving area 14*a* of the device 10*a* of Fig. 2, for example, although it is understood that the other devices may be used.

The cathode ray tube 80 is provided with a light collimating means 82, which may comprise any of the well known means for confining the light from the cathode ray tube 80 in parallel beams. As shown in Fig. 10, the light collimating means 82 forms the face plate or closure member of the tube 80 and comprises a perforated metallic member 84 sealed to the funnel portion of the tube 80. The perforations are filled with glass or other transparent material forming transparent plugs 86. The inside surface of the face plate 82 is coated with a cathode-luminescent or electron sensitive phosphor 88. The outside surface of the face plate 82 is disposed closely adjacent to the image receiving end 14*a* of the device 10*a*, which comprises a thin sheet 36 of glass or plastic which is light transmitting, and the transparent conductive coating 34 on the glass sheet and in contact with the photoconductive material or elements 38.

The face plate 84 is constructed in the manner shown in order that the light emitted from the phosphor 88 will be collimated within the light transmitting plugs 86 and will reach the photoconductive elements 38 without spreading of the light and without resultant loss in resolution. Normally, spreading of light and consequent loss of resolution would occur if a face plate made entirely of thick glass were used. By reason of the fact that the sheet 36 of glass on the outside surface of the face plate 82 is not supported in vacuum and need not withstand the force of atmospheric pressure, as is the case with the face plate 82, it may be made very thin to minimize any spreading of the light which passes through it before the light is received by the photoconductive elements 38.

In operation, the light from the image on the cathode ray tube 80 is received directly by the photoconductive elements 38, whereupon a magnified image is reproduced on the image producing area 16*a* in a similar manner to that previously described. Inasmuch as no optical lens system is used, this system is very compact and can be mounted in an enclosure of very small size.

What is claimed is:

1. An electroluminescent device comprising a photoconductive layer, an electroluminescent layer spaced therefrom, a multiplicity of spaced elongated conductors electrically connecting spaced areas of one surface of said photoconductive layer with corresponding spaced areas of one surface of said electroluminescent layer, the center-to-center spacing between said elongated conductors on one of said surfaces being greater than the center-to-center spacing of said elongated conductors on the other of said surfaces and electrically conductive means on the other surfaces of said layers respectively and adapted to be connected to a voltage source.

2. The invention according to claim 1 wherein the ends of said conductors adjacent to said electroluminescent layer define an area which is greater than the area defined by their opposite ends.

3. The invention according to claim 1 wherein said conductors are disposed in layers on laminations of thin sheets of insulating material.

4. The invention according to claim 3, wherein the conductors on each sheet are divergent towards said electroluminescent layer.

5. An electroluminescent device comprising a planar array of elongated photoconductive elements, a layer of electroluminescent material spaced from said array, a multiplicity of spaced elongated conductors electrically connecting spaced areas on one side of each photoconductive element with corresponding spaced areas on one side of said electroluminescent layer, the center-to-center spacing of said elongated conductors on each of said photoconductive elements being less than the center-to-center spacing of said elongated conductors on said electroluminescent layer, first electrically conductive means extending along and contacting the other side of each photoconductive element, and second electrically conductive means extending along and contacting the other side of said electroluminescent layer, said first and second conductive means being adapted to be connected to opposite terminals of a voltage source.

6. The invention according to claim 5 wherein said conductors are disposed in layers on laminations of thin sheets of insulating material.

7. The invention according to claim 6 wherein the conductors on each sheet are divergent towards said electroluminescent layer.

8. An electroluminescent device comprising a planar array of elongated photoconductive elements, a layer of electroluminescent material spaced from said array, a multiplicity of spaced elongated conductors electrically connecting spaced areas on one side of each photoconductive element with corresponding spaced areas on one side of said electroluminescent layer, first electrically conductive means extending along and contacting the other side of each photoconductive element, and second electrically conductive means extending along and contacting the other side of said electroluminescent layer, said first and second conductive means being adapted to be connected to opposite terminals of a voltage source, said conductors being disposed in layers on laminations of thin sheets of insulating material, and the ends of said thin sheets that are adjacent to said electroluminescent layer being staggered to produce a slope which is longer than the corresponding dimensions at their opposite ends.

9. The invention according to claim 6 wherein the conductors lying on one side of each sheet lap over an edge of the sheet, said overlapped edges being disposed on one side of said device.

10. The invention according to claim 6 wherein a layer of current diffusing material is disposed intermediate said electroluminescent material and the ends of said conductors.

11. An electroluminescent device comprising a planar array of elongated photoconductive elements, a planar array of elongated electroluminescent elements spaced from said first array, a multiplicity of spaced elongated conductors electrically connecting spaced areas on one side of each photoconductive element with corresponding spaced areas on one side of one of said electroluminescent elements, the center-to-center spacing of said elongated conductors on said one of said electroluminescent elements being greater than the center-to-center spacing of said elongated conductors on each of said photoconductive elements first electrically conductive means extending along and contacting the other side of each photoconductive element, and second electrically conductive means extending along and contacting the other side of each electroluminescent element, said first and second conductive means being adapted to be connected to opposite terminals of a voltage source.

12. The invention according to claim 11 wherein the diverging ends of said conductors terminate in conductive areas having dimensions substantially greater than the width of said conductors.

13. The invention according to claim 11 wherein said first electrically conductive means comprises a planar array of parallel elongated conductors.

14. An electroluminescent device comprising a laminated structure of three sets of thin insulating sheets, said sheets being interleaved at one end of each sheet to produce a single planar area, the opposite ends of the sheets in each set arranged to produce three separate planar areas, each smaller than said single area, a photoconductive material on each of said separate areas, an array of three sets of elongated electroluminescent elements on said single area, each set being of different color emitting material, a multiplicity of elongated conductors on each of said sheets connecting spaced areas on a side of one of said photoconductive materials with spaced areas on a side of one of said electroluminescent elements, first electrically conductive means extending along and contacting the other side of each photoconductive layer, and second electrically conductive means extending along and contacting the other side of each electroluminescent element, said first and second conductive means being adapted to be connected to opposite terminals of a voltage source.

References Cited in the file of this patent

UNITED STATES PATENTS

| | | |
|---|---|---|
| 2,495,697 | Chilowsky | Jan. 31, 1950 |
| 2,768,310 | Kazan et al. | Oct. 23, 1956 |
| 2,773,992 | Ullery | Dec. 11, 1956 |
| 2,792,447 | Kazan | May 14, 1957 |
| 2,818,531 | Peek | Dec. 31, 1957 |
| 2,836,766 | Halsted | May 27, 1958 |
| 2,858,363 | Kazan | Oct. 28, 1958 |
| 2,861,206 | Fiore et al. | Nov. 18, 1958 |

FOREIGN PATENTS

| | | |
|---|---|---|
| 157,101 | Australia | June 16, 1954 |

OTHER REFERENCES

Tele-Tech and Electronic Industries, "The Light Amplifier," page 75, page 75 relied upon. February 1955.